G. W. GREGORY.
APPARATUS FOR CHOPPING FOODSTUFFS.
APPLICATION FILED DEC. 27, 1921.
1,421,458. Patented July 4, 1922.
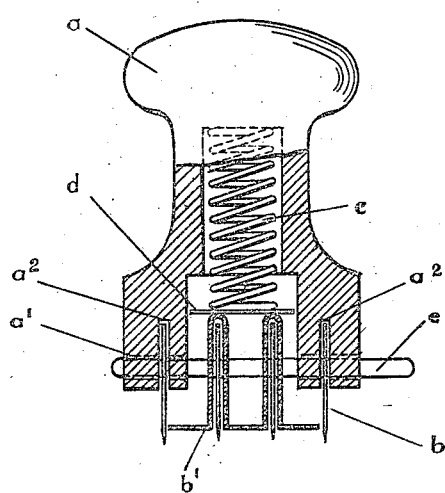
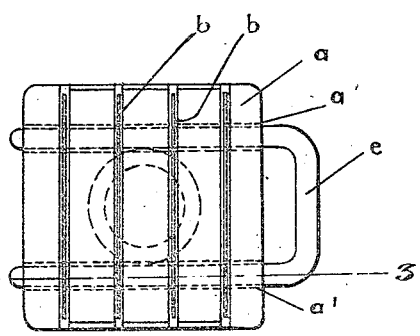
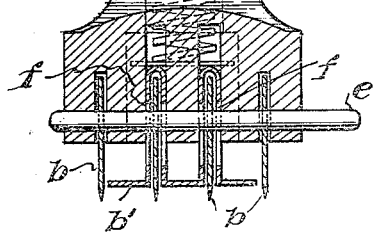

UNITED STATES PATENT OFFICE.

GEORGE WRIGHT GREGORY, OF LONDON, ENGLAND.

APPARATUS FOR CHOPPING FOODSTUFFS.

1,421,458.  Specification of Letters Patent.  Patented July 4, 1922.

Application filed December 27, 1921. Serial No. 525,162.

*To all whom it may concern:*

Be it known that I, GEORGE WRIGHT GREGORY, a subject of the King of Great Britain and Ireland, residing at 128 Putney Bridge Road, Putney, London, S. W., England, have invented certain new and useful Improvements in Apparatus for Chopping Foodstuffs, of which the following is a specification.

This invention relates to improvements in apparatus for chopping food stuffs. My invention has for its object to provide a simple, cheap and efficient apparatus which will carry out the functions named. The main object of my invention is to mount a number of blades and so hold them in a handle by means which readily admit of the holder for the blades being abstracted so that a broken blade may readily be replaced. Further, my invention also embodies the means whereby a spring operated ejector removes chopped stuffs between the blades.

In order that my invention may be fully understood I have appended a sheet of drawings in which Figure 1 shews a front sectional elevation of the chopper. Figure 2 shews an underside plan of Figure 1. Figure 3 is a sectional view taken on the line 3—3 of Figure 2.

Referring to the drawings, $a$ is a suitable handle hollowed out vertically to accommodate a spiral spring $c$, one end of which abuts the stop end of the handle whilst the other end rests on a disc $d$ which in turn rests on top of the ejector $b^1$. $b$ are blades inserted into the slits in the handle such as $a^2$, whilst at right angles to the slits in the handles are two apertures $a^1$, $a^1$. The blades $b$ are provided with two holes not shewn and the arrangement is such that the U-shaped securing fork $e$ is caused to pass through the holes $a^1$ in the handle and through the holes in the blades thus in conjunction with the slits $a^2$ in the handle, the blades are firmly secured in position.

The ejector $b^1$ is provided with vertical slots $f$ $f$ as shown in Figure 3 so as to permit the ejector to move relative to the arms of the fork $e$.

In use when food stuffs engage with both of the ejectors $b^1$ it tends to force the ejector up against the spring $c$ but as soon as the pressure is removed the ejector re-asserts itself and pushes off the chopped stuff from in between the blades.

Claims:

1. In apparatus for chopping food stuffs in which a plurality of blades are employed and having a spring actuated ejector, the combination therewith of a U-shaped fork for the purpose of retaining the blades in position and allowing of easy replacement as set forth.

2. In apparatus for chopping food stuffs as characterized in claim 1 the handle having a spring cavity, a disc bearing plate for the ejector, the ejector, plurality of blades, holder with slits in the bottom, apertures at right angles thereto and U-shaped prong, as set forth.

GEORGE WRIGHT GREGORY.